UNITED STATES PATENT OFFICE.

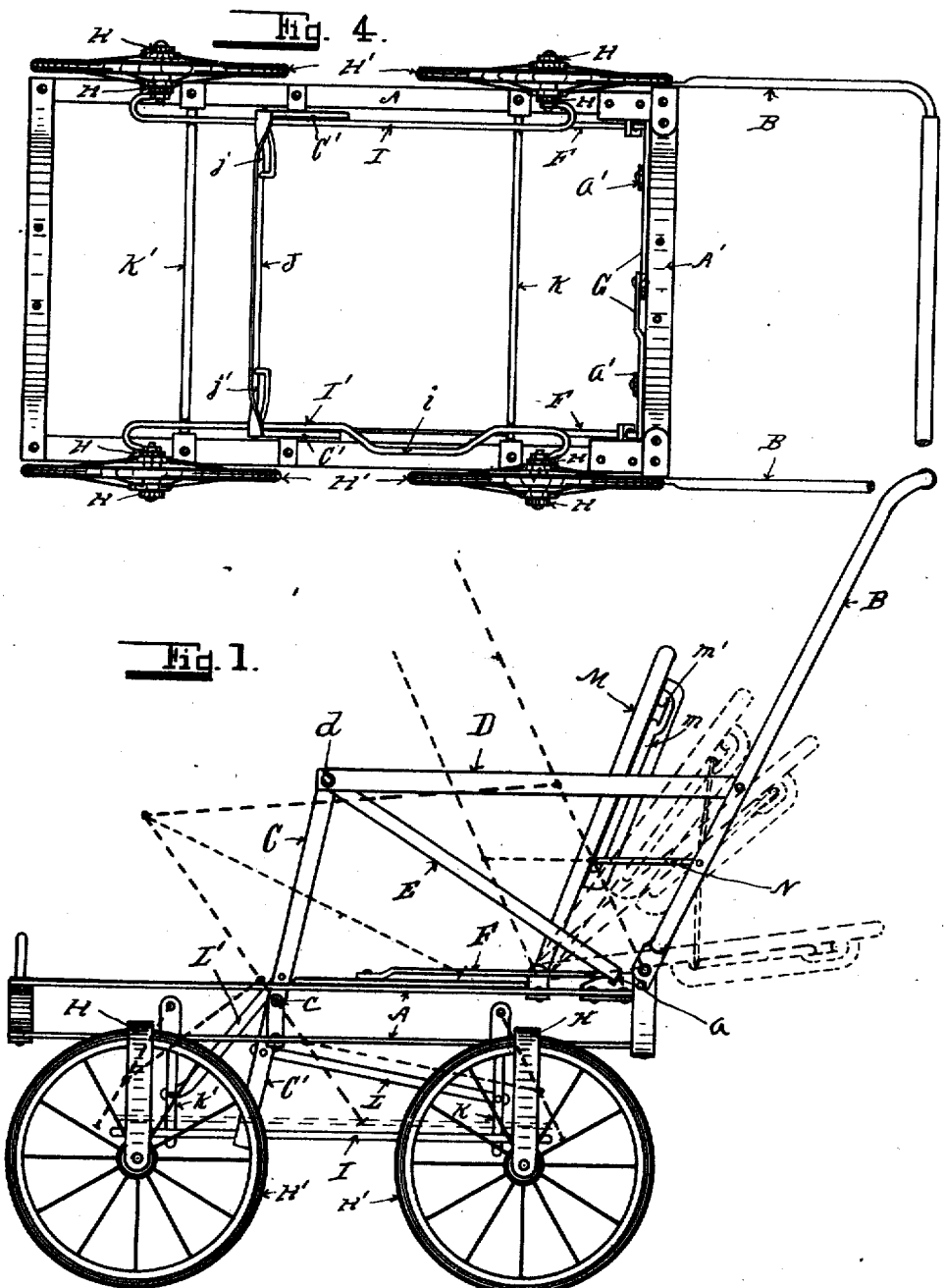

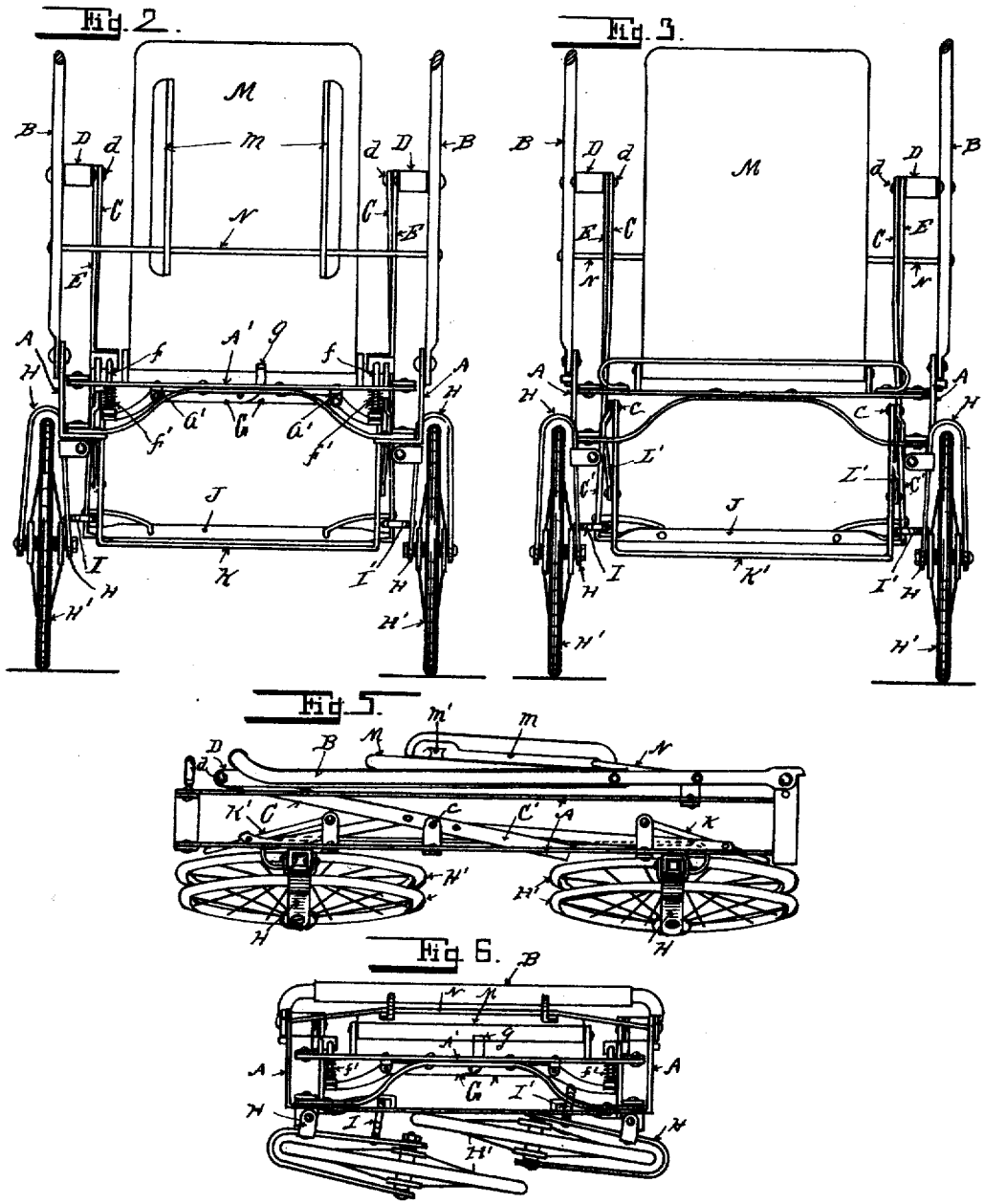

CLARK F. THAYER, OF ERIE, PENNSYLVANIA.

BABY-CARRIAGE.

No. 913,071.  Specification of Letters Patent.  Patented Feb. 23, 1909.

Application filed October 12, 1908. Serial No. 457,295.

*To all whom it may concern:*

Be it known that I, CLARK F. THAYER, a citizen of the United States, residing at Erie, in the county of Erie and State of Pennsylvania, have invented certain new and useful Improvements in Baby-Carriages; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to improvements in baby-carriages and has for its object the construction of a baby carriage which can be readily folded together when not in use. To accomplish this result I construct the running gear of the carriage, and the sides of the seat so that they will fold together on the release of the braces of the sides of the seat, and the movement of the handle forward over the seat.

The construction of my improved baby carriage and the operation of the mechanism thereof are hereinafter fully set forth and explained and illustrated in the accompanying drawings, in which:

Figure 1 is a view in side elevation of a baby-carriage embodying my invention. Fig. 2 is a rear end view in elevation of the same. Fig. 3 is a front end view in elevation of the same. Fig. 4 is a view of the under side of my improved baby carriage. Fig. 5 is a side view of my improved baby-carriage folded up. Fig. 6 is an end view of the same.

In these drawings illustrating my invention, A represents the frame of the carriage body, to the rear end of which there is hinged a handle B. Intermediate of the frame at each side of the carriage body A, I pivot on pivots $c$ uprights C C forming the fronts of the sides of the carriage body, and to the upper ends of the uprights C bars D D are pivoted at their front ends by means of pivots $d$ and at their rear ends they are pivoted to the handle B, and from the pivots $d$ braces E pivoted thereon extend diagonally to the rear end of the frame A where their rear ends removably engage notches $a$ therein, and these braces E also engage at their rear ends with guide rods F secured at their front ends to the sides of the frame A, their rear ends $f$ passing down through the rear cross-bar A′ of the frame A where they are provided with spiral springs $f'$, and their ends contact with the ends of a centrally hinged tripping bar G pivoted to supports $a'$ $a'$ on the cross-bar A′ of the frame.

One of the sections of the tripping bar G has an upward extension $g$, which, when depressed, operates the tripping-bar G to raise the rear ends of the guide-bars F and the braces E out of the notches $a$ in the sides of the frame A, so as to permit the rear ends of the braces E to slide forward on the guide-bars F as and for the purpose hereinafter set forth.

The wheel supports H are so pivoted to the side-bars of the frame A, that they can be folded inward under the carriage body frame, the wheels H′ on one side folding over the wheels on the other. The axes of the wheels H′ are pivoted on suitable bearings in these supports H in the usual manner.

To the insides of the lower ends of the supports H at one side of the carriage body I secure a rod I curved at its ends but having the intermediate portion thereof straight, and at the other side of the carriage body I secure a like rod I′ which however has an intermediate offset $i$ therein.

On the uprights C C there are extensions C′ C′ extending downwardly below their pivotal connections with the frame A, and secured to the lower ends of said extensions C′ C′ there is a cross-bar J provided with slots $j$ $j'$ at its ends embracing the rods I and I′, so that when the upper ends of the uprights C are moved forward in the operation of folding the carriage together, the cross-bar J is moved toward the rear end of the carriage along the rods I and I′ in the slots $j$ $j'$ therein, and as the slot $j'$ engages the offset $i$ in the rod I′ it operates on said rod to fold the wheel supports H H to which the rod I′ is secured inward in advance of the operation of the cross-bar J upon the rod I to fold the wheel supports H H on that side of the carriage inward, so that when the carriage is folded up the wheels on one side of the carriage are folded under the wheels on the opposite side of the carriage, as illustrated in Figs. 5 and 6.

To the sides of the rear part of the frame A, I pivot a U-shaped member K which normally extends downward so as to form a brace between the rear ends of the rods I and I', and pivoted to the sides of the front part of the frame A, I pivot a like U-shaped member K' which also normally extends downward so as to form a brace between the front ends of the rods I and I', both of which U-shaped braces are clearly shown in Figs. 2 and 3. To the extensions C' on the uprights C below the pivotal connections c thereof with the frame A, I pivot links L which extend back to and are pivoted to the arms of the U-shaped brace K, so that as the extensions C' are moved backward the links L move the U-shaped brace K back from between the rear ends of the rods I I' as illustrated by dotted lines in Fig. 1, and to the uprights C above their pivotal connections c with the sides of the frame A, I pivot links L' which extend forwardly to and are pivoted on the arms of the U-shaped brace K' so that as the uprights C move forward the links L' move the U-shaped brace K' forward from between the front ends of the rods I I' as illustrated by dotted lines in Fig. 1.

The back M of the carriage body is pivoted at its lower end to the sides of the frame A, and is provided with a U-shaped brace N the arms of which are pivoted in the arms of the handle B, and on the back of the part M there are slotted guides m provided at their upper ends with stops m' in which guides the U-shaped brace N operates so as to hold the back M at such angle to the body of the carriage as may be desired.

In the operation of folding the carriage together as illustrated in Figs. 5 and 6, the rear ends of the side braces E are released from the notches a in the sides of the frame A by depressing the tripping bar G; the handle B is then moved forward which operates through the bars D D to move the upper ends of the uprights C C forward and the extensions C' C' thereon backward. The first effect of this is to move the U-shaped braces K and K' from between the ends of the rods I and I' so as to allow the wheel supports H and the wheels H' carried thereby to be folded inward. The further forward movement of the handles B operating through the parts D, C and C', operates to move the slotted bar J backward under the carriage body and as it contacts with the off-set i in the rod I' it folds the wheel supports to which the rod I' is secured inward in advance of its action upon the rod I to turn the wheel supports to which it is attached inward, and the further movement of the handle B down upon the top of the carriage body completes the operation of folding of all the parts together. For opening up the carriage for use the movement of the handle B is simply reversed.

In Fig. 1, I have illustrated in broken lines the different adjustments of which the back M is capable, and I have also illustrated in broken lines the movement of the handle B, the back M, and the parts D, C, C' E L L', K and K' during the commencement of the folding operation.

Having thus described my invention so as to enable others to construct and operate the same, what I claim as new and desire to secure by Letters-Patent is:

1. The combination in a baby-carriage of a carriage body-frame, a handle hinged to the rear end of the carriage-body-frame, carriage body-sides hinged to the handle and to the sides of the carriage body-frame, wheel-supports hinged to the sides of the carriage body-frame, longitudinal rods secured to the wheel-supports adjacent to the wheel axes thereon connecting the front and rear wheel-supports at each side of the carriage, and arms extending downwardly from the carriage body-sides and engaging said longitudinal rods, whereby the folding of the handle forward and down upon the carriage body-frame operates to fold the carriage body-sides down upon the top of the carriage body-frame, and the wheel-supports and wheels thereon up thereunder, substantially as set forth.

2. The combination in a baby-carriage, of a carriage body-frame, wheel supports hinged to the sides thereof so as to fold inwardly under the carriage body-frame, longitudinal rods secured to the wheel-supports adjacent to the wheel axes thereon connecting the front and rear wheel-supports at each side of the carriage, a handle pivoted to the rear of the carriage body-frame, uprights for the body sides pivoted to the sides of the carriage body frame, bars pivoted to the tops of said uprights and to the handles, downwardly extending arms on said uprights, a cross-bar connecting the lower ends of said extensions and the longitudinal rods between the wheel-supports, whereby the moving of the handles forward folds the body sides down upon the top of the frame and the wheel-supports inwardly under the body-frame, substantially as set forth.

3. The combination in a baby-carriage, of a carriage-body-frame, wheel-supports hinged to the sides thereof so as to fold inward under the carriage body-frame, longitudinal rods secured to the wheel-supports adjacent to the wheel axes thereon connecting the front and rear wheel supports at each side of the carriage, a handle pivoted to the rear of the carriage-body frame, uprights forming the fronts of the body-sides pivoted to the sides of the carriage-body-frame, bars pivoted to the said uprights and to the handles, downwardly extending arms on said uprights, a slotted cross-bar engaging the rods connecting the wheel-supports, secured to said downwardly extending arms, diagonal braces pivoted to the body-side uprights and detachably connected with the rear of the body-frame, and means for detaching said braces from the rear of the body-frame, whereby the handle can be moved forward and fold the body sides forward and down upon the body frame, and the wheel-supports and wheels up under the body frame, substantially as set forth.

4. The combination in a baby carriage, of a body-frame, wheel-supports hinged thereto, longitudinal rods secured to the wheel-supports adjacent to the wheel axes thereon connecting the front and rear wheel-supports at each side of the carriage, U-shaped braces pivoted to the carriage body-frame adapted to engage the front and rear ends of said rods so as to maintain the wheel supports in a vertical position, means for operating said braces in unison with the folding and unfolding of the handle and carriage-body sides down upon the carriage body, a slotted cross-bar engaging the rods connecting the wheel supports, uprights connected with said cross-bar and extending upward so as to form the fronts of the carriage body-sides pivoted intermediate of their length to the side of the carriage body-frame, a handle pivoted to the rear end of the body-frame, bars pivoted to the body-side uprights and to the handles, braces pivoted to and extending from the tops of the body-side uprights to and engaging with notches at the rear end of the body-frame, guides for the lower ends of said braces when disengaged from said notches, and means for disengaging said braces from said notches, substantially as set forth.

5. The combination in a baby-carriage, of a body-frame having brace-notches in the rear ends of the sides thereof, uprights pivoted to the side frames forming the fronts of the carriage body-sides, braces pivoted to the tops of said uprights and extending rearwardly to and detachably engaging the notches in the rear end of the body frame, guides secured to the sides of the body-frame with which the lower ends of said braces slidably engage, and means for raising the ends of said braces out of the notches in the frame, substantially as set forth.

6. The combination in a baby-carriage, of a body-frame, wheel-supports pivoted thereto, longitudinal rods secured to the wheel-supports adjacent to the wheel axes thereon connecting the front and rear wheel supports at each side of the carriage, an outwardly extending offset in one of said rods, a slotted cross-bar engaging said rods, uprights secured to said slotted cross-bar pivoted intermediate of their length to the sides of the carriage body, whereby as the upper ends of said uprights are moved forward the wheel supports are folded inward, the wheel supports connected by the offset rod in advance of those on the opposite side of the carriage, substantially as set forth.

In testimony whereof I affix my signature, in presence of two witnesses.

CLARK F. THAYER.

Witnesses:
H. M. STURGEON,
G. J. MEAD.